Feb. 10, 1953
P. RICHARTZ
2,627,656
SCISSORS WITH TWIST IN EACH BLADE
Filed Aug. 30, 1948
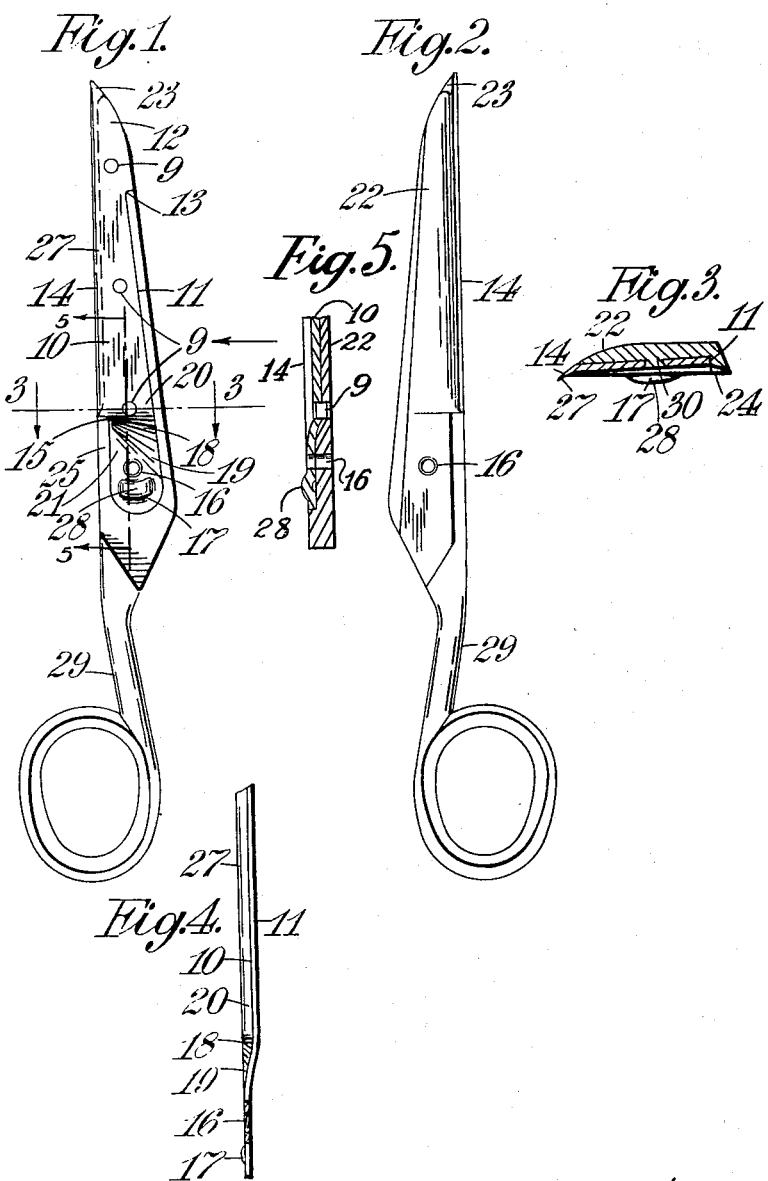
INVENTOR
PAUL RICHARTZ
BY
Young Emery & Thompson
ATTYS.

Patented Feb. 10, 1953

2,627,656

UNITED STATES PATENT OFFICE 2,627,656

SCISSORS WITH TWIST IN EACH BLADE

Paul Richartz, Sheffield, England

Application August 30, 1948, Serial No. 46,851
In Great Britain February 6, 1947

3 Claims. (Cl. 30—254)

This invention relates to scissors and has for one of its objects to ensure even cutting throughout the movement of the cutting blades. Attempts have been made heretofore to accomplish this by so forming the opposed faces of the blades that each of them is of a slight twisted shape which is distributed along the length therof, whereby the cutting edges are slightly bowed, and so as to provide at the intersection of the cutting blades backed-away portions across the width of the blades, thereby preventing jamming during cutting. The blades have been concavely formed across the width e. g. hollow ground.

According to this invention, scissors are characterised in that the cutting edge of each blade is substantially straight along the operative portion of the blade, and in that each blade is so formed as to provide a twist confined to a locality near the pivot axis whereby the necessary backing-off of the blade is provided along the length of the blade. The straight cutting edge facilitates a straight cut being obtained with the scissors.

Preferably, a bearing face is provided on each blade on the opposite side of the pivot axis to the twist, which bearing face is so shaped that as the two blades are pivoted together the cutting edges are maintained in contact at their point of intersection. The shaping of each bearing face may be cam-like so that the pressure between the contacting cutting edges is maintained substantially constant over the movement of the blades.

Preferably, the faces of the blades forwardly of the twists and away from the bearing faces, are substantially flat, and each is inclined across the width of the blade to a plane normal to the pivot axis. Preferably, also, the shaping of the blades is such that lines extending along the length of the flat part of each blade are arranged to be normal to or only at a slight angle to the axis of pivoting.

The above shape of blade may be provided by a pressing operation.

The above arrangement results in that the plane of the face of each blade forwardly of the pivot axis, looking in the direction of the length of the blade, is inclined transversely to the flat face of the blade rearwardly of the pivot so that said forward faces diverge from each other as they extend transversely from the cutting edge towards the back edge of the blade.

Although the blades forwardly of the twists and away from the bearing faces are substantially flat, the marginal portions along the cutting edges may be bent out of the general plane of the blade to provide an effect similar to hollow grinding.

The above arrangements are particularly applicable to the type of scissors in which the cutting blades are formed separately from and attached to handle portions.

For example, the cutting blades may be formed from sheet steel of substantially uniform thickness and may be pressed so as to provide the aforesaid twisted shape and bearing faces in a single or multiple pressing operation before or after the blades are hardened. It will be appreciated however, that the same shaping could be applied to a strip of wedge-shaped section.

Preferably, the handle portions are arranged to back the blades over substantially the whole area thereof. They may also be provided with a part arranged to extend over the back edge of each blade, which part is arranged to lie substantially flush with the exposed face of the blade.

The handle portions and backing parts may be moulded or die-cast from comparatively cheap moulding material such as alloys or plastic.

The moulding operation is preferably carried out so that the part of the backing which is in contact with the face of the blade is correspondingly shaped and thus abuts the blade over the whole area. Furthermore, the part of the backing which extends along the back edge of the blade is so shaped that as viewed along the back it is substantially straight, as distinct from the twisted shape of the back edge of the blade.

The blades may be attached to the backing parts of the handle portions by shanks which are moulded integrally with the backing parts and which extend through holes in the blades and are riveted over into countersunk portions of said holes, or in certain instances, the backing may be secured to the blades by separate rivets.

The following is a description of one form of scissor construction according to the invention, reference being made to the accompanying drawing, in which:

Figure 1 is a view of the interior face of one of the cutting blades and handle portion;

Figure 2 is a view of the exterior face of the handle and backing plate;

Figure 3 is a section on the line 3—3 in Figure 1, looking in the direction of the arrows and showing a bearing face projecting in exaggerated manner.

Figure 4 is a view looking on the back edge of the cutting blade before assembly with the handle portion in the direction of the single arrow as shown in Figure 1, the twist in the blade being shown in exaggerated manner for the purpose of assisting the description.

As already indicated, the cutting blade 10 may be stamped from sheet steel of uniform thickness and its contour is so shaped in the stamping operation that the back edge 11 is inset from the pointed end 12 of the blade forming a shoulder 13 while the cutting edge 14 is also inset for a short distance at the opposite end of the blade to provide a small shoulder 15. A number of holes 9 are also punched or drilled in the blade including a pivot hole 16. During a stamping operation a twist is imparted to a locality of the blade adjacent the pivot hole as indicated at 18, which twist is about an axis forwardly of the pivot 16 and extending away from the pivot hole 16 transversely of the blade but inclined somewhat in a direction longitudinally of the blade so that both portions of the blade on either side of the twist remain for the most part flat but with their planes at an angle to one another. The forward portions of the blades 10 are thus each inclined to a plane normal to the pivot axis across the width of the blade. With this arrangement, the cutting edge of each blade and lines along the face of the blade parallel to the cutting edge lie in planes normal to the pivot axis, or at a small angle to the axis of the pivot, by reason of the upraised bearing face 17. It will thus be seen that the parts 20 of the blades near the back edge and forwardly of the twist 18 are depressed with respect to the parts 19, also on the back edge on the rear side of the twist 18 and adjacent the pivot hole, while those parts 21 at and rearward of the pivot hole 16 lie in a plane containing the cutting edges of the blades. The twist thus forms a shallow shoulder slanting forwardly away from the pivot axis and toward the back edge of the blade. The bearing faces 17 are cam-like and disposed on that side of the pivotal axis adjacent the handles 29, which cam faces are so shaped that their height gradually increases from their ends to high points at the center of the cams, which points on the cams are in contact when the blades are in a closed position so that the cutting edges of the blades are maintained in contact at their point of intersection throughout the pivotal movement at substantially the same pressure. These cam faces are therefore highest at the point marked 28.

The cutting edge may, during a pressing operation, be bent out of the general plane of the blade, as indicated at 27, so as to provide an effect similar to hollow grinding. The handle portion may be formed in a moulding operation in which the mould is so shaped that the moulded material, such as a cheap alloy or plastic, extends over the greater part of one face of the blade to provide a backing 22 but leaving the cutting edge exposed and also a part of the pointed end 23. The moulded material, however, extends over the back edge of the blade at 24 so as to lie substantially flush with the exposed face of the blade and it also extends at 25 into the recessed portion rearwardly of the shoulder 15 at the rear extremity of the cutting edge adjacent the twist 18. Thus, the two shoulders 13 and 15 of the blade interlock with corresponding shoulders of the moulded metal. In the case where an alloy is employed it is so moulded as to provide shanks 30 which extend through the holes 9 and are riveted over into countersunk portions of these holes.

The handle portions 29 are moulded in conventional shape, and when moulded from alloy may be heavily metal-plated before the assemblage of the blades, and the blades may be formed from strip steel which may be polished after hardening.

The accurate location of the blades by the moulded or die-cast backing parts enables the blades to be whetted before assemblage.

I claim:

1. Scissors comprising blades pivoted to one another, and each having along the greater part of the length thereof, on the forward side of the pivot axis, a flat face and a straight cutting edge bordering that face, and a twist on a part of the blade adjacent to the axis of pivoting so as to form an inclined shoulder in the blade adjacent but forwardly of the pivot while the front or cutting edge remains straight whereby the flat faces of the blades forwardly of the pivot are arranged at an angle to one another across the width of the blade, those faces of the blades adjacent and rearward of the pivot axis being provided with bearing parts which bearing parts abut one another.

2. Scissors comprising blades pivoted to one another, and each having along the greater part of the length thereof, on the forward side of the pivot axis, a flat face and a straight cutting edge bordering that face, and a twist in a part of the blade so formed adjacent to the pivot axis that an inclined shoulder is formed in the blade while the front or cutting edge remains straight and so that the flat faces of the blades forwardly of the pivot are arranged at an angle to one another across the width thereof, and there being a raised bearing face on a part of each blade on the opposite side of the pivot axis to the twist which raised face is adapted to maintain the cutting edges in contact at their points of intersection.

3. Scissors comprising blades pivoted to one another, and each having along the greater part of the length thereof, on the forward side of the pivot axis, a flat face and a straight cutting edge bordering that face, which cutting edge is bent out of the general plane of the blades to provide an effect similar to hollow grinding, and there being a twist in that part of each blade which is adjacent to and forwardly of the axis of pivoting so directed that the maximum inflection of the blade is at the rear edge of the blade, while the front edge of the blade remains straight and whereby the flat faces of the blades are arranged at an angle to one another across the width thereof and so that those parts of the blades around the axis of pivoting abut one another.

PAUL RICHARTZ.

REFERENCES CITED

The following references are of record in the file of this patent:

UNITED STATES PATENTS

| Number | Name | Date |
|---|---|---|
| 222,672 | Conover | Dec. 16, 1879 |
| 468,207 | Prohaska | Feb. 2, 1892 |
| 1,556,769 | Driest | Oct. 13, 1925 |
| 1,748,701 | Boyd | Feb. 25, 1930 |
| 1,956,588 | Parker | May 1, 1934 |
| 2,032,281 | Haywood | Feb. 25, 1936 |
| 2,284,664 | Kissling | June 2, 1942 |
| 2,377,906 | Schaaff | June 12, 1945 |